United States Patent [19]
Gähwiler

[11] 3,852,666
[45] Dec. 3, 1974

[54] METHOD AND APPARATUS FOR COMPENSATION OF THE TEMPERATURE-DEPENDENCY OF THE CONDUCTIVITY OF A FLUID WITH SUSPENDED PARTICLES

[75] Inventor: Hermann Gähwiler, Zurich, Switzerland

[73] Assignee: Contraves AG, Zurich, Switzerland

[22] Filed: May 21, 1973

[21] Appl. No.: 362,011

[30] Foreign Application Priority Data
June 30, 1972 Switzerland.................. 009830/72

[52] U.S. Cl............................ 324/71 CP, 324/30 R
[51] Int. Cl...................... G01n 27/00, G01n 27/42
[58] Field of Search..................... 324/71 CP, 30 R

[56] References Cited
UNITED STATES PATENTS
3,358,223   12/1967   Birnstingl....................... 324/30 B
3,502,974   3/1970   Coulter et al................. 324/71 CP FOREIGN PATENTS OR APPLICATIONS
864,075   2/1971   Canada............................... 324/30

Primary Examiner—Alfred E. Smith
Assistant Examiner—Rolf Hille
Attorney, Agent, or Firm—Werner W. Kleeman

[57] ABSTRACT

A method of, and apparatus for, the compensation of the temperature-dependency of the conductivity of an electrically conductive liquid during pulse amplitude measurement of particles suspended in the liquid by means of a conductivity cell, especially during the determination of the mean or average volume of blood particles, wherein the supply of the conductivity cell in the low-frequency range is undertaken by a voltage source and in the useful frequency range by a current source. The conductivity cell is connected with a constant direct-current voltage source and with at least one frequency filter.

6 Claims, 3 Drawing Figures

FIG. 1
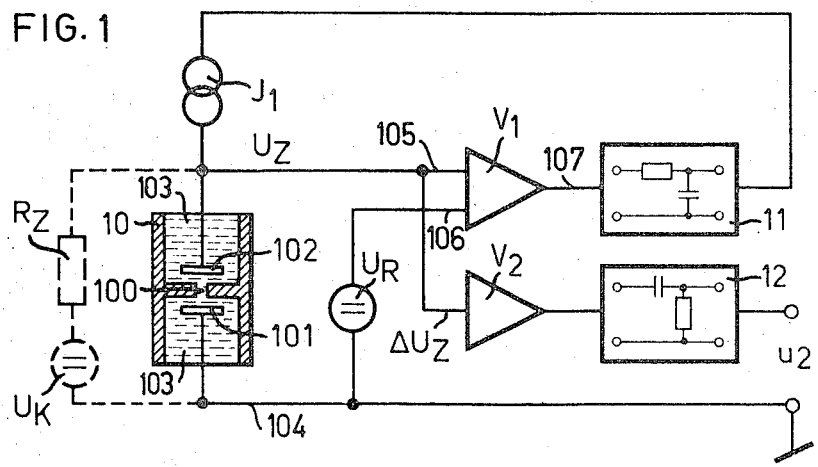
FIG. 2
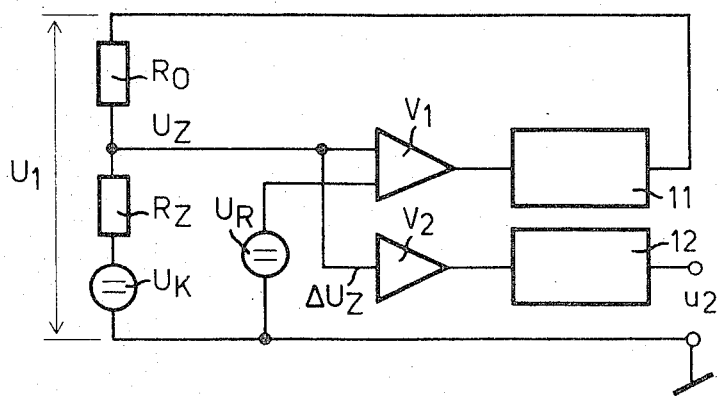
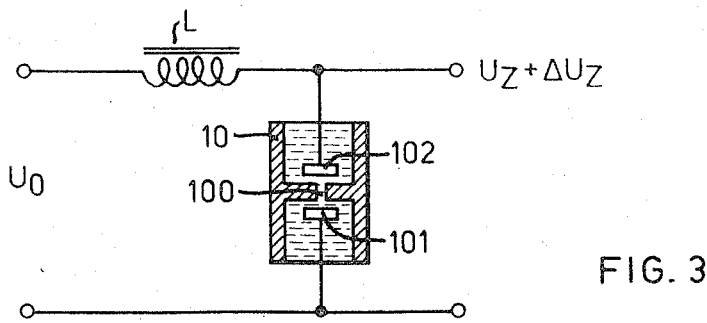
FIG. 3

METHOD AND APPARATUS FOR COMPENSATION OF THE TEMPERATURE-DEPENDENCY OF THE CONDUCTIVITY OF A FLUID WITH SUSPENDED PARTICLES

BACKGROUND OF THE INVENTION

The present invention relates to a new and improved method of compensating the temperature-dependency of the conductivity of an electrically conductive liquid during pulse amplitude measurement of particles suspended in the liquid by means of a conductivity cell, especially during the determination of the mean or average volume of blood corpuscles or particles, and this invention also pertains to a new and improved construction of apparatus for the performance of the aforesaid method.

A particularly useful and primary field of application of this technique and the equipment used for the performance thereof is the determination of the average or mean volume of blood corpuscles or particles determined by a blood particle-evaluation device. There are known to the art blood particle-evaluation devices, also referred to as blood cell counters or analyzers, employing a conductivity cell wherein to both sides of a relatively short and narrow capillary path or capillary there is provided a respective compartment for an electrolytic blood thinning liquid and in each such compartment an electrode. If a constant direct-current is conducted through both electrodes and the intermediately situated liquid or fluid path which is narrowed by the capillary path and if at the same time a predetermined volume of liquid containing the blood particles in a certain dilution is forced through the capillary path from the one liquid compartment into the other, then during throughpassage of the blood particles through the capillary path there appear voltage pulses which clearly exceed the average direct-current voltage peak. These pulses can be filtered in known manner and counted. The peak amplitudes of such pulses are proportional to the volume of the blood particles producing such pulses during passage through the capillary path. Now since for comparing a blood profile or picture of individuals with standard blood profiles there is not only of significance the number of blood particles per unit quantity of blood but also the average volume of the blood particles is of extreme importance for diagnostic purposes, with the known devices there is determined the average or mean volume of the blood particles. Devices of this type have been disclosed in my commonly assigned, co-pending United States application Ser. No. 288,421, filed Sept. 12, 1972, to which reference may be readily had and incorporated herein by reference, and also in U.S. Pat. No. 3,473,010, granted Oct. 14, 1969.

For supplying the conductivity cell there is employed a current source wherein the voltage-pulse amplitude resulting from passage of the blood particles through the capillary path, with constant measurement current, is proportional to the change in resistance in the liquid measuring path, in other words $\Delta U_z = J_z \cdot \Delta R_z$. The change in resistance $R_z$ is proportional to the specific resistance of the electrolytic liquid and this value is markedly temperature-dependent. Consequently, with the known circuits the resultant voltage-pulse amplitude and the measurement value determined therefrom for the mean or average volume of the blood particles is markedly dependent upon the temperture of the liquid. Heretofore such drawback has been overcome with relatively great effort by frequent calibration of the measuring device and by using liquids which have been tempered to certain values.

SUMMARY OF THE INVENTION

Accordingly, it is a primary object of the present invention to provide an improved method of, and apparatus for, compensating the temperature dependency of the conductivity of an electrically conductive liquid during pulse amplitude measurements of particles suspended in the liquid.

Another object of the present invention aims at extensively eliminating the temperature-dependency of the conductivity of a liquid during the determination of the mean or average volume of particles suspended in the liquid and the therewith associated drawbacks.

Yet a further significant object of the present invention relates to a new and improved method of, and apparatus for, compensating the temperature-dependency of the conductivity of a liquid during determination of particles suspended in such liquid, especially during the termination of the mean or average volume of blood particles.

Now in order to implement these and still further objects of the invention, which will become more readily apparent as the description proceeds, the invention proposes a method for the compensation of the temperature-dependency of the conductivity of an electrically conductive liquid during pulse amplitude measurement of particles suspended in the liquid by means of a conductivity cell, especially during the determination of the mean or average volume of blood particles, wherein a voltage source supplies the conductivity cell in the low-frequency range and a current source supplies the conductivity cell in the useful frequency range.

The apparatus for the performance of the method is characterized by the features that the conductivity cell is connected with a constant direct-current voltage source and with at least one frequency filter.

A basic description of the method and exemplary embodiments of apparatus, which serve for the realization of the inventive method and illustrated in the drawings, will be explained more fully hereinafter.

BRIEF DESCRIPTION OF THE DRAWING

The invention will be better understood and objects other than those set forth above, will become apparent when consideration is given to the following detailed description thereof. Such description makes reference to the annexed drawing wherein:

FIG. 1 is an exemplary embodiment of an active conductivity cell-supply circuit;

FIG. 2 illustrates a variant of the circuit of FIG. 1 with the supply occuring via a high-ohm resistor; and FIG. 3 is an exemplary embodiment of passive conductivity cell-supply circuit.

DETAILED DESCRIPTION OF THE PREFERRED EMBODIMENTS

Prior to discussing in detail the circuit arrangements depicted in FIGS. 1 to 3 there will be initially considered certain aspects of the system. The cross-section of the capillary path or capillary of the conductivity cell is much greater than that of the particles which are to be measured, in other words $A_K \gg A_T$. It can be mathematically proven that the change in resistance, owing to the passage of a particle through the capillary path, is proportional to the specific resistance of the liquid and to the particle volume and inversely proportional to the square of the capillary cross-section, in other words $$\Delta R_z = \rho(V_T/A_K^2). \qquad 1.$$

Without particles in the capillary path the resistance amounts to:

$$R_z = \rho(l_K/A_K) \qquad 2.$$

wherein $A_K$ represents the cross-section and $l_K$ the length of the capillary path. For the relative change $\Delta R_z/R_z$ there thus results with $V_K = A_K \cdot l_K$ as the capillary volume:

$$\Delta R_z/R_z = V_T/V_K \qquad 3.$$

whereby there is overcome the dependency of the specific resistance and respectively the temperature-dependency of the conductivity of the liquid.

The total voltage appearing across the conductivity cell is composed of two components, namely the polarization voltage $U_K$ of the conductivity cell, which can be considered to be constant, and the component $J_z \cdot R_z$ which is proportional to the cell resistance, in other words $U_z = U_K + J_z \cdot R_z$. Consequently, the current flowing through the conductivity cell can be expressed by the equation:

$$J_z = (U_z - U_K)/R_z \qquad 4.$$

Hence for the voltage pulse amplitude with constant measuring current there is valid the following equation:

$$\Delta U_z = J_z \cdot \Delta R_z = (U_z - U_K) \cdot (\Delta R_z/R_z) \qquad 5.$$

and thus $$\Delta U_z = (U_z - U_K) \cdot (V_T/V_K)$$

Hence, according to equation (5), and provided that $U_z - U_K$ is maintained constant and the conductivity cell is nonetheless supplied with a constant current with respect to the particle measurement, the measured pulse amplitude is only dependent upon the conductivity cell direct-current voltage $U_z$, the polarization voltage $U_K$, the capillary volume $V_K$ and the particle volume $V_T$. The pronounced temperature-dependency conductivity of the electrolytic liquid no longer plays any role. Since the polarization voltage $U_K$ can be assumed to be constant the conductivity cell voltage $U_z$ must be stablized. In the technologically interesting range the resistance change $R_z$ is very small in comparison to the conductivity cell resistance $R_z$, so that for $R_z$ the influence of the resistance change owing to a particle can be neglected. The following basic considerations now must be still taken into account: the resistance changes owing to the temperature-dependency of the electrolytic liquid are of lowfrequency character, minutes or hours per °C, whereas the resistance changes owing to passage of the particles through the capillary path or capillary are relatively high-frequency in nature, approximately 200 Hz to 50 kHz. Both components can be easily frequency separated.

A method for the compensation of the temperature-dependency of the electrolytic liquid is thus possible according to the invention in that the supply of the conductivity cell in the low-frequency range or region is undertaken by a voltage source and in the useful frequency range or region, in the range of about 200 Hz to 50 kHz, by a current source.

Turning now to the drawing, and according to the exemplary embodiment of FIG. 1 there is partially schematically illustrated therein a circuit having a controlled or regulated current source for supplying a conductivity cell 10. Between the electrodes 101 and 102, each of which is arranged in a respective liquid compartment 103 of the conductivity cell 10, there is provided a relatively short capillary connection or capillary flow path 100. Electrode 101 is electrically coupled with the ground conductor 104 and the electrode 102 is connected with one terminal of a current source $J_1$ and with the one input 105 of an amplifier $V_1$. The second input 106 of the amplifier $V_1$ is supplied by a direct current voltage source $U_R$ which is regulated to a constant voltage and connected by one pole or terminal with the ground conductor 104. The regulating or control circuit of the current source $J_1$ is closed or completed via the amplifier output 107 and the series connected low-pass filter or filter circuit 11.

The high-frequency component $\Delta U_z$ of the conductivity cell voltage $U_z$ appears via the series connected amplifier $V_2$ and the high-pass filter or filter circuit 12, in other words amplified and filtered, in the form of the voltage $u_2$ for further processing or evaluation. The conductivity cell-equivalent circuit has been depicted in phantom lines and encompasses the total cell resistance $R_z$ and the polarization voltage $U_K$ formed in the cell. The filter circuits 11 and 12 are designed in known manner such that the low-pass filter 11 only further conducts or transmits the slow thermal fluctuations while the high-pass filter 12 only conducts frequencies in the useful frequency range of the particle measurement and greater frequencies.

According to FIG. 1 there is illustrated a principal circuit arrangement by means of which the mean or average conductivity cell voltage $U_z$ is controlled or regulated via the amplifier $V_1$, the low-pass filter 11 and the current source $J_l$ for low frequencies and thermal changes respectively, so as to be always proportional to the reference voltage $U_R$. Hence the average conductivity cell current thus amounts to $J_z \approx (U_z - U_K)/R_z$.

The pulse amplitude $\Delta U_z$, which is decoupled via the amplifier $V_2$ and the high-pass filter 12 as the voltage $u_2$, amounts to:

$$\Delta U_z = J_z \cdot \Delta R_z = (U_z - U_K) \cdot (\Delta R_z/R_z)$$

wherein the condition for temperature compensation is fulfilled.

In FIG. 2 there is illustrated a possibility of circuit design with a passive current source, that is the supply via a high-ohm resistor $R_0$ instead of the current source $J_1$ of FIG. 1. In all other respects the circuitry is unchanged as concerns its construction and function with regard to the disclosure of the circuit of FIG. 1. From the mathematical analysis of such circuit, which is not here presented in detail, it should be apparent that by accommodation of the values $R_0$, $R_z$ and $v_1$ (gain of the amplifier $V_1$) it is possible to attain over a considerable variation range of the conductivity cell resistance $R_z$ effective square compensation with extremes in the reference value. As a pre-condition there must be satisfied $R_0 \gg R_z$ and thus $U_1 \gg U_z$. For high frequencies there then prevails the function $$\Delta U_z = (U_z - U_K)(R_0)/(R_0+R_z) \cdot (\Delta R_z/R_z)$$

wherein the temperature-dependency of the particle measurement can be extensively eliminated. In order to attain a sufficient compensation $R_0$ must be chosen so as to be approximately one order of magnitude greater than $R_Z$. For instance, if $R_Z = 15$ kohms, $R_0 = 165$ kohms, $U_Z = 4.4$ volts and $U_K = 2.3$ volts, then the temperature stabilization for $0.7\ R_{Z0} \leq R_Z \leq 1.3\ R_{Z0}$ with the circuit of FIG. 2, is better than 1 percent.

A further principal circuit arrangement for temperature compensation with an inductance, i.e. the current coil L as the frequency filter has been depicted in FIG. 3. Here the coil L is dimensioned such that the relationship $\omega L/R_Z$ in the useful frequency range is very large and in the frequency range of the thermal changes very small respectively, wherein for a conductivity cell current of $J_{DC} = U_0/R_Z$ the pulse amplitude $\Delta U_Z = J_{DC} \cdot \Delta R_Z = U_0\ (\Delta R_Z/R_Z)$ and therefore there is likewise fulfilled the condition for temperature compensation.

While there is shown and described present preferred embodiments of the invention it is to be distinctly understood that the invention is not limited thereto but may be otherwise variously embodied and practiced within the scope of the following claims. Accordingly,

What is claimed is:

1. A method for the compensation of the temperature-dependency of the conductivity of an electrically conductive liquid during pulse amplitude measurement of particles suspended in the liquid by means of a conductivity cell, especially during the determination of the average volume of blood particles, comprising the steps of supplying the conductivity cell over its liquid-temperature dependent low-frequency range by a voltage source and over its useful frequency range for pulse amplitude measurement by a current source, and using at least one frequency filter for separating the low-frequency range from the useful frequency range.

2. An apparatus for compensating the temperature-dependency of the conductivity of an electrically conductive liquid during pulse amplitude measurement of particles suspended in the liquid by means of a conductivity cell comprising means for compensating the temperature-dependency of the electrically conductive liquid, said compensating means embodying a constant direct-current voltage source and at least one frequency filter, the conductivity cell being electrically coupled with the constant direct-current voltage source and said frequency filter.

3. The apparatus as defined in claim 2, including circuit means incorporating a series connected first amplifier, low-pass filter and a current source, said direct-current voltage source supplying the conductivity cell via said first amplifier, said low-pass filter and said current source, said circuit means further including a series connected second amplifier and a high-pass filter electrically connected with the conductivity cell and serving for decoupling pulse amplitudes.

4. The apparatus as defined in claim 2, including circuit means incorporating a series connected first amplifier, low-pass filter and resistor, said direct-current voltage source supplying the conductivity cell via said first amplifier, said low-pass filter and said resistor, said circuit means further including a series connected second amplifier and high-pass filter electrically connected with the conductivity cell and serving for decoupling pulse amplitudes, said resistor possessing a high-ohmic value in contrast to the conductivity cell resistance.

5. The apparatus as defined in claim 2, wherein said frequency filter is an inductance, said inductance being dimensioned such that in the useful frequency range $\omega L$ is much greater than the resistance of the conductivity cell and for low-frequency changes $\omega L$ is much smaller than the resistance of the conductivity cell, said inductance, the constant direct-current voltage source and the conductivity cell being electrically connected in series, and output leads for pulse amplitude measurements electrically connected with the conductivity cell.

6. The apparatus as defined in claim 5, wherein the inductance comprises a coil.

* * * * *

Disclaimer 3,852,666.—*Hermann Gahwiler*, Zurich, Switzerland. METHOD AND APPARATUS FOR COMPENSATION OF THE TEMPERATURE-DEPENDENCY OF THE CONDUCTIVITY OF A FLUID WITH SUSPENDED PARTICLES. Patent dated Dec. 3, 1974. Disclaimer filed Dec. 22, 1975, by the assignee, *Contraves AG*.

Hereby enters this disclaimer to claims 1, 2, 5 and 6 of said patent.

[*Official Gazette February 10, 1976.*]